March 12, 1957 H. L. WALLEROTH 2,785,292
DETACHABLE VEHICLE LAMP SUPPORT
Filed Nov. 20, 1953

INVENTOR
*H. L. WALLEROTH*

BY
ATTORNEYS

United States Patent Office 2,785,292
Patented Mar. 12, 1957

2,785,292

DETACHABLE VEHICLE LAMP SUPPORT

Harald Laurentius Walleroth, Mjolby, Sweden

Application November 20, 1953, Serial No. 393,472

Claims priority, application Sweden December 2, 1952

1 Claim. (Cl. 240—57)

The present invention relates to the art of vehicle lighting.

More particularly, this invention relates to a vehicle lamp mounting arrangement. And specifically, this invention relates to a removable attaching arrangement for the rear lights of vehicles, particularly but not limited to, commercial vehicles such as trucks.

In the interest of safety, numerous requirements as to loading, lighting and operating vehicles have been enacted. It has been noted that a great number of automobile accidents have occurred when passenger vehicles operating at a rather high speed have driven into a rearwardly projecting load on a parked truck. Such a load may comprise pipe, lumber or the like. In order to curtail such accidents, it is usually prescribed that the end of such a rearwardly projecting load by clearly marked, for example, by attaching a red cloth thereto. Such an arrangement is effective in daylight. However, with the truck parked at night the red cloth is not visible. While the parking lights or rear reflectors on the back of a truck are visible, they can deceive the driver of an oncoming car as to the location of the rear terminal end of the truck to such an extent that the oncoming car can ram into the rearwardly projecting load, even if the oncoming car is slowing down to park. The driver may not adequately judge the distance and location of the rear end of the load and in fact, may not even see the rearwardly projecting load but would assume that the rear reflector or parking light marks the rear limit of the truck. It is also possible that a car or another truck may ram into the rearwardly projecting load of a preceding truck on the highway while both are in motion since the conventional red cloth marking the rear limit of the load might not be noticed.

Accordingly, the present invention has for an object to provide a vehicle lamp mounting arrangement which will minimize the possibilities of such type accidents.

Specifically, the invention has for an object to provide a lamp mounting arrangement including plural mounting components, one of which is fixed and the other of which carries the rear lamp and is removably associated with the fixed component whereby the rear lamp or lamps if two are involved, can be removed from a fixed position and fastened to the end of a rearwardly projecting load so as to clearly mark and illuminate the rear end of the load and further illuminate any cloth or other marker attached to the load.

For a specific object, the present invention provides a mounting plate having a planar portion for attachment to the body or frame of a vehicle and which mounting plate has a tongue member spaced therefrom but parallel thereto and a second mounting or attachment plate carrying a lamp having an embossed portion adapted to cooperate with the tongue of the first mounting plate for removably securing the second mounting plate and its attached lamp to the first.

Specifically, the invention provides an arrangement in which the second mounting or attachment plate is provided with means whereby this plate and the lamp attached thereto may be readily mounted on the end of a rearwardly projecting load of a truck.

Further and more specific objects will be apparent from the accompanying drawings in which.

Figure 3:
Figure 3 is an elevational view of the mounting plate that is fixed to the vehicle body.
Figure 4:
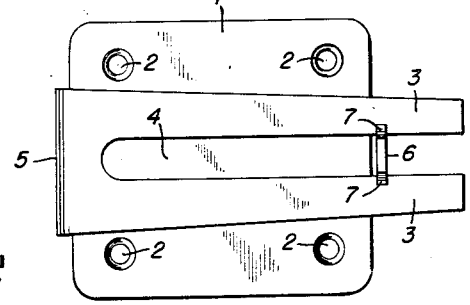
Figure 4 is a plan view of the plate shown in Figure 3.

In connection with the present invention, it is to be pointed out that truck bodies usually have two longitudinally extending girders of channel shaped formation that form portions of the frame of the truck. Each of these girders usually receives mounting means for a tail light. In other arrangements, the bed of the truck has a depending metal plate at the rear of the truck body and the tail lights are mounted on the depending plate. The location of the component parts of the present invention is governed solely by the form and construction of the truck body in question but there is always some space at the rear end of the truck bed or frame to which the square mounting plate 1 illustrated in Figures 3–5 can be secured. This is a fixed component of the present invention. The movable component of this invention comprises the attachment plate 8 that carries the lamp or tail light. The tail light can be any of the well known conventional types so long as it can be mounted on the attachment plate. To permit moving the lamp carrying plate 8 the distance between the fixed mounting plate and the rear end of the projecting load, the cable or wires to the tail light or lamp on the plate 8 can be extensible or the tail light arrangement can be such that an extension cord fixture is utilized in which, when the attachment plate 8 is mounted on the mounting plate 1, a plug connection is effected with the tail light, whereas when the lamp carrying attachment plate 8 is mounted on the rear end of a projecting load as described hereinafter, an extension cord can be used to extend between the point of attachment of plate 8 at the rear of the load and the area adjacent the fixed mounting plate 1. If the tail light is of the type in which an extensible cord arrangement is embodied, a suitable housing can also be mounted on the truck frame such as on one of the longitudinal girders which carries a reel or the like to accommodate the cable so that when the attachment plate 8 and the lamp secured thereto is removed from the mounting plate 1 and fastened to the rear end of the rearwardly projecting load, the light cable can be extended to permit moving the lamp carrying plate to its new position.

Figure 5:
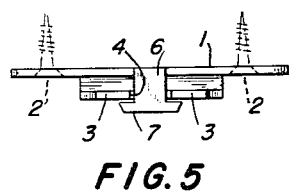
Figure 5 is an end elevational view of the arrangement shown in Figure 3.

In connection with the drawings, the invention is illustrated with reference to the two component parts of the mounting with the lamp or tail light being illustrated diagrammatically. The fixed mounting plate 1 is substantially square and provided with fastening apertures 2 by which it can be bolted or otherwise fastened to either a girder on the truck frame at the rear end thereof or a plate member embodied at the rear end of the truck body. This mounting plate 1 is provided with a tongue 3 which is bent back to lie in a position parallel with the plate and which tongue is bifurcated, that is, it is slit from its outer free end inwardly along its length to a point adjacent the juncture of the tongue 3 with the plate 1. From the end of the mounting plate 1 opposite the bend 5, there projects a lug-like member 6 which is disposed perpendicular to the plane of the plate 1 and as shown in Figure 5, is provided with transversely extending ears or projections 7. The outer ends of these projections are beveled ends with the ends slanting downwardly and inwardly when the plate is in the position shown in Figure 5. The lug member 6 has a width substantially the same as the width of the slot 4. This arrangement is such that the respective arms of the tongue 3, which are yieldable, can be sprung laterally and then outwardly, that is, move away from plate 1 so as to clear the end of the lug 6 whereupon, as described hereinafter, the attachment plate 8 can be mounted between the tongue 3 and the body of the plate 1 following which the arms of tongue 3 can be pushed back toward the body of the plate 1 and the inclination of the beveled ends of the ears 7 will be such that the arms of the tongue will snap over these ends to hold the attachment plate and the lamp secured thereto in place.

Figure 1:
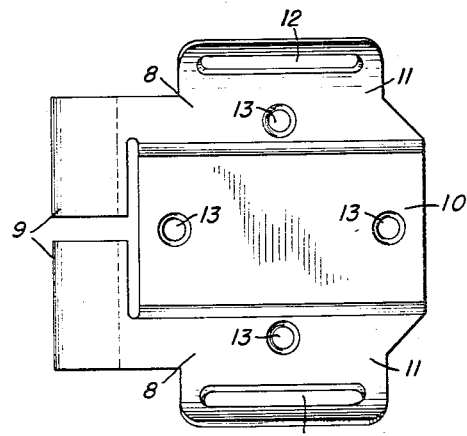
Figure 1 is a plan view of the mounting plate to which is attached the lamp.
Figure 2:
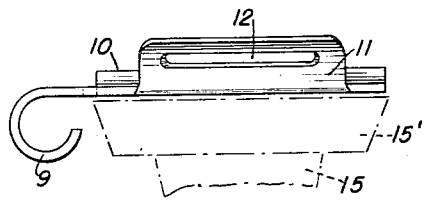
Figure 2 is a side elevational view of this plate.
Figure 6:
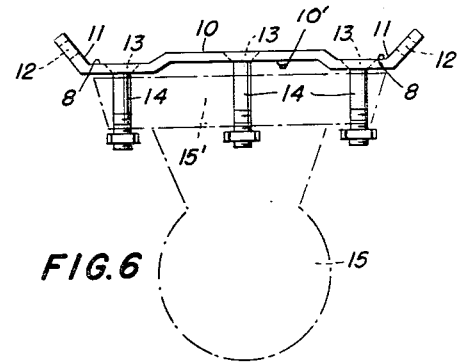
Figure 6 is an end view of the attachment plate as seen from the right in Figure 2.

The attachment plate 8 as shown in Figure 2, is provided at one end with the down-turned rolled portion 9 which functions as a combined handle or rope attachment. For example, the cord or rope holding the red cloth to be attached to the end of a truck load, could be mounted in this portion 9. Alternatively, this portion 9 can be used in fastening the attachment plate and the lamp associated therewith to the end of the rearwardly projecting load. Extending perpendicular to this rolled portion 9 is an embossed portion 10 that provides a channel 10' as shown in Figure 6, that is to be slid over the tongue 3 when the arms of the latter are deflected laterally and depressed down away from the lug 6. The opposite sides of the attachment plate 8 are provided with up-turned ears 11 having slits 12 therein adapted to receive straps as hereinafter described. The attachment plate is provided with fastening apertures 13 which receive screws or bolts 14 and the lamp holder 15' that houses the lamp 15, which is denoted diagrammatically.

In the utilization of this invention, the plate 1 is fixedly attached to the frame of the vehicle and then the arms of tongue 3 are pressed apart and away from plate 1 to a position spaced from the bottom of the lug 6 following which the attachment plate 8 with the lamp secured thereon is slid over the tongue so that the two arms of the tongue lie in the space 19' between the base of the lamp holder and the adjacent surface of the plate 8. With the attachment plate mounted on the tongue, the same is then pushed back toward the plate 1 so that the arm spread laterally in passing the ears 7 and the plate 8 is secured to plate 1. It is noted that the dimensions of the plate 1 longitudinally of the slot 4 are such as to accommodate the attachment plate 8 with the lamp thereon. When it is desired to mount the lamp at the rear end of the rearwardly projecting load, the arms of tongue 3 are spread laterally and deflect away from plate 1 so as to clear the lug 6 following which the attachment plate 8 is slid off the arms of the tongue and then the attachment plate 8 with the lamp secured thereto is suitably mounted to the rear end of the load. If the load happens to be lumber, suitable straps can be passed through the slits 12 and over a board of the load to secure the lamp in place. If necessary, a rope could be passed through the rolled portion 9 to help in attaching the lamp to the load. If straps cooperating with the slits 12 provide a secure fastening of the attachment plate 8 and the lamp to the load, the rolled portion 9 can be used to receive a cord or rope that supports a red cloth or warning flag.

While this invention is particularly suitable for trucks of the flat bed and open body type, it can be utilized on panel trucks in such instances where such type trucks will be used to carry lumber or pipe.

While I have shown and described a preferred embodiment in the present invention, it is to be understood that this disclosure is merely an example of the principles of the invention and the right is reserved to make all such changes in the details of construction as will widen the field of utility and increase the adaptability of the invention, provided such changes constitute no departure from the spirit of the invention or the scope of the claim hereunto appended.

What I claim is:

A support for removably associating at least one lamp with the rear end of a vehicle while permitting removal of the lamp for attachment to the end of a rearwardly projecting load on the vehicle so as to clearly mark and illuminate the load, said support including a planar mounting plate adapted to be fixedly secured to the vehicle, said plate having an integral extension from one end thereof that is bent back upon itself to overlie the plate in spaced parallelism therewith, said extension having a length such as to project beyond the opposite end of the plate and constituting a yieldable bifurcated member having spaced arms, a lug projecting from the said opposite end of the plate, disposed between the arms and having ears projecting from the opposite sides thereof and extending transversely of the arms and overlying the same, said ears having beveled ends so that after the arms are deflected and the bifurcated member pressed away from the plate the beveled ends facilitate reassociation of the arms beneath the ears, a lamp attachment plate adapted to receive a lamp housing thereagainst, said attachment plate having a depressed portion defining a channel underlying a lamp housing for removably receiving the said arms, said channel having a length less than the axial extent of the arms so that when the arms of the bifurcated member are displaced laterally and moving away from the mounting plate to clear the ears the attachment plate can be slid thereon with the arms passing through the channel, whereupon subsequent reassociation of the arms of the bifurcated member beneath the said ears mounts the attachment plate and a lamp carried thereby on the vehicle.

References Cited in the file of this patent

UNITED STATES PATENTS

| | | |
|---|---|---|
| 1,060,186 | Hjorth | Apr. 29, 1913 |
| 1,643,131 | Saxon | Sept. 20, 1927 |
| 1,725,182 | Dorsey | Aug. 20, 1929 |
| 1,757,177 | Eichner | May 6, 1930 |
| 1,893,303 | Philips | Jan. 3, 1933 |

FOREIGN PATENTS

| | | |
|---|---|---|
| 3,056 | Great Britain | 1904 |